3 Sheets--Sheet 1.
T. CASTOR.
Street-Cars.
No. 6,059. Reissued Sept. 22, 1874.
FIG. I.
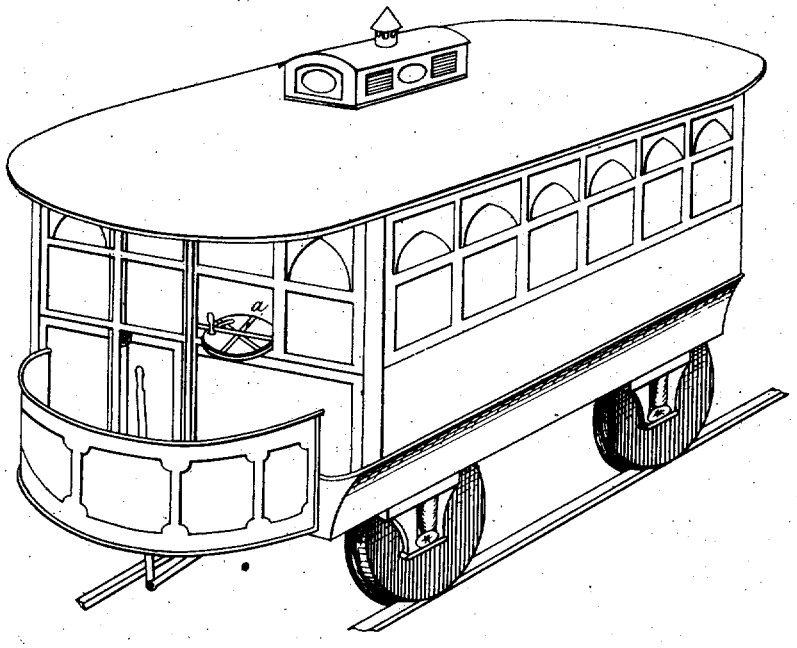
FIG. IV.
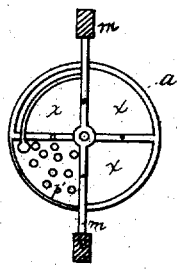
FIG. V.
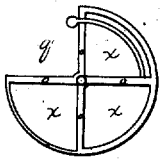
FIG. VI.
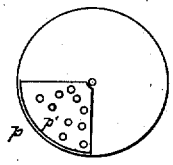
FIG. VII.
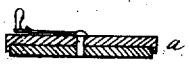
WITNESSES:
D. C. Stuart
J. Knight
INVENTOR:
Thos. Castor
per A. Hanway
Attorney
THE GRAPHIC CO. PHOTO-LITH. 39 & 41 PARK PLACE, N.Y.

3 Sheets--Sheet 2.
T. CASTOR.
Street-Cars.
No. 6,059.
Reissued Sept. 22, 1874.
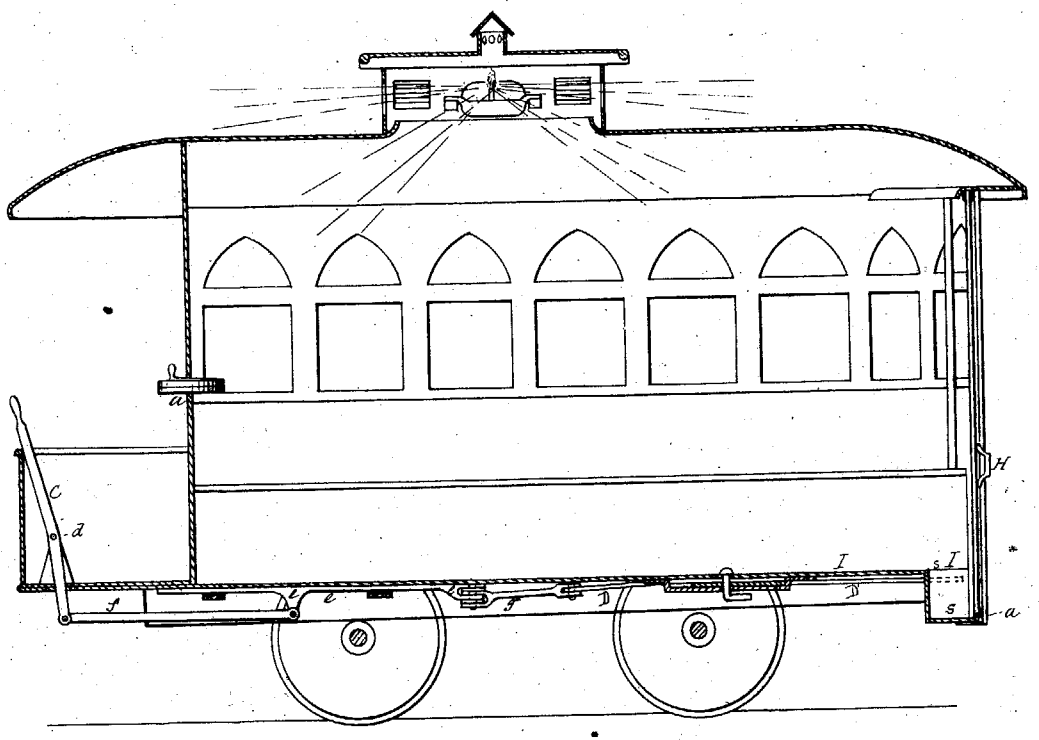
FIG. II.
WITNESSES:
D. G. Stuart
W. H. Knight
INVENTOR:
Thos. Castor
per S. Hanway
attorney
THE GRAPHIC CO. PHOTO-LITH. 39 & 41 PARK PLACE, N.Y.

3 Sheets--Sheet 3.
T. CASTOR.
Street-Cars.
No. 6,059.
Reissued Sept. 22, 1874.
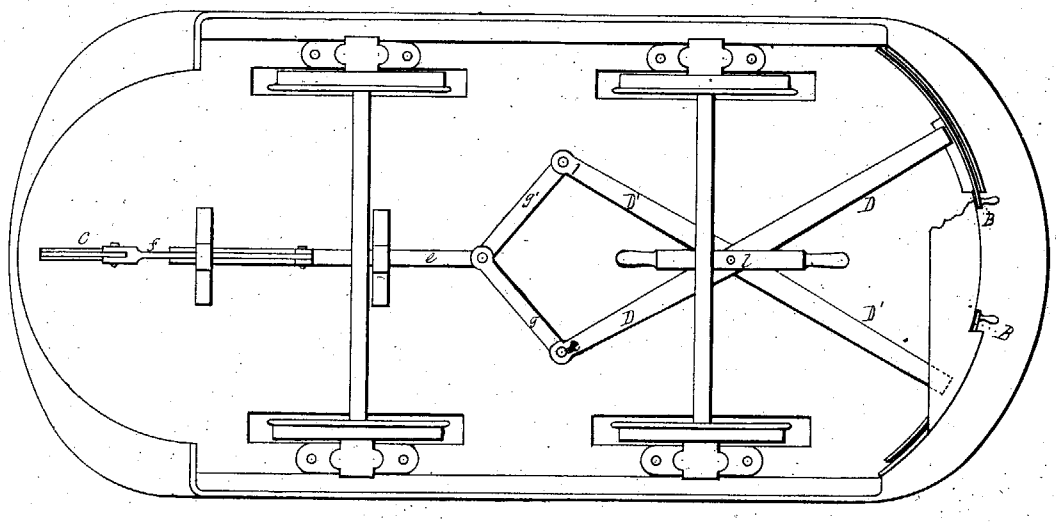
FIG. III.
WITNESSES:
D. G. Stuart
J. J. Knight
INVENTOR:
Thos Castor
per
S. J. Harmay
Attorney
THE GRAPHIC CO. PHOTO-LITH. 39 & 41 PARK PLACE, N.Y.

UNITED STATES PATENT OFFICE.

THOMAS CASTOR, OF PHILADELPHIA, PENNSYLVANIA, ASSIGNOR, BY MESNE ASSIGNMENTS, TO JOHN STEPHENSON, OF NEW YORK CITY.

IMPROVEMENT IN STREET-CARS.

Specification forming part of Letters Patent No. 32,681, dated July 2, 1861; reissue No. 6,059, dated September 22, 1874; application filed August 3, 1874.

DIVISION C.

*To all whom it may concern:*

Be it known that I, THOMAS CASTOR, of Philadelphia, in the State of Pennsylvania, have invented a certain new and useful Improvement in Street-Cars, of which the following is a specification, reference being had to the accompanying drawings, making part of this specification, in which—

Figure 1 represents a view in perspective of a street-car having my improvements applied thereto, and Fig. 2 a vertical longitudinal section of the same. Fig. 3 represents a plan of the under side of the car. Fig. 4 represents a plan of the money or fare box detached from the car, and partial section of window-sash as applied to the top of the box. Fig. 5 represents a plan of the upper side of the upper half or cover of the box; and Fig. 6, a similar view of the under half, showing the money-receptacle. Fig. 7 represents a vertical section of the box.

This subdivision of my original patent relates to a new and improved combination of instrumentalities with a street-car, by means of which the services of a conductor can be dispensed with, and the driver enabled to perform the respective duties of both without, in so doing, having to leave his post on the front platform of the car.

The nature of my invention for these purposes consists in combining, with a street-car, the following instrumentalities, to wit: First, a rear end suitably constructed, and provided with a sliding door or doors and supporting-rail of conformable shape; secondly, suitable mechanism attached at one end to the door, and arranged at the other within convenient reach of the driver while on his platform in front of the car, that he may, at will, open and close the entrance to the car for the ingress and egress of his passengers; and, thirdly, a fare-box conveniently arranged for the inspection and collection of the fare by the driver when deposited by the passengers.

To enable those skilled in the art to make, construct, and use my improvement, I will now proceed to describe its details, omitting a particular description of such parts of a car as are non-essential to a full understanding of this branch of my invention.

A suitable car for carrying my improvement into effect should be provided with but one platform, and that for the sole use of the driver; and such a car is shown in Figs. 1, 2, and 3 of the drawings.

In the front end of the car is arranged the fare-box *a*, and which, for the purposes of this branch of my improvement, may be made and used in any known manner.

A suitable box is shown in its details in Figs. 3, 4, 5, and 6, and which consists of two disks arranged the one above the other, and so connected with each other that while the lower half is fastened to the car, the upper one is free to turn on a suitable pivot fixed centrally to the lower. Each of these disks has a quarter segment cut therefrom, shown at *q* for the upper half in Fig. 5, and for the lower half at *p*, Fig. 6. In place of the section taken out of the latter disk, I fit and secure thereto a money drawer or receptacle, *p*, into which the driver deposits the fare as collected from the passengers.

The operation is as follows: The fare is placed upon either of the quarters *x x*, on the inside of the car, by the passengers. The driver then turns the upper disk until the fare is brought outside of the car, and until the money-drawer *p'* is uncovered. He meanwhile inspects and examines the fare, and, on being satisfied that it is correct, deposits it in the drawer *p'*, and then turns the disk back to its proper position again for a new fare. In this position it is held by a catch-spring, or by any other suitable device.

By such means the driver is enabled to collect the fares of the passengers without the necessity either of quitting his position on the platform, or even of opening the door.

The top of the upper disk is provided with strips *o o*, which run at right angles to each other. Over these the sash *m* fits closely, and thus avoids all drafts in winter.

The next feature of my improved combination relates to the control of the driver over the entrance to the car, by means of mechanism attached at one end to the door, and conveniently arranged to his hand at the other, for the purpose of operating it. To this end I cover the entrance to the car with a sliding door or doors, H. The rear end of the car for this purpose is suitably constructed, and guide-ways formed in its walls, and provided with a rail or way, *a*, for the support of the lower end of the door. This rail or way is arranged and supported in a plane, preferably below the level of the under side of the floor of the rear end of the car, so as to furnish a suitable place of attachment to the door of the operative mechanism at a point below the floor I. Suitable mechanism for this purpose is shown in Figs. 1 and 2, in which a lever, C, is represented as being mounted on a fulcrum, *d*, on the front platform, the lower end of which is pivotally connected to the one end of a link-rod, *f*, the other end of which is connected to a slide-rod, *e*, to the other end of which is pivoted an end of two link-rods, *g g'*. Each of these link-rods is then connected at its other end to the end of one of two pivoted levers, D D', in the manner shown in Fig. 3. The levers D D' are mounted upon a common fulcrum, *l*, at a suitable point between their two ends, and are attached in any well-known and proper way at their rear end to that portion of the doors B B which extends below the level of the floor I of the car. Thus arranged and connected, the operation is as follows: By moving the handle of lever C toward the body of the car, the ends 1 and 2 of levers D D' are drawn together by means of the link-rods *g g'*, slide-rod *e*, and link-rod *f*, and thus force the half-doors B B over the entrance so as to close it. By moving lever C in the opposite direction the door will be opened.

Where the end of the car is circular, the doors will slide more easily; but this is not essential.

If the rear end of the car is made square, the doors, guideway, and supporting-rail should be made to conform therewith, and in that case the levers D D' should be connected with the doors by means of a connecting-link or short rod. And with regard to the lever C upon the front platform, it may be connected with the door or doors by any known combination of levers or devices which will give the desired motion.

The steps *s* of the car may be arranged inside, and the door, being extended down, will cover them, thereby preventing persons from riding surreptitiously, or getting in and out of the car without the knowledge and consent of the driver, thus giving the latter complete control of the car, so far as the ingress and egress of passengers are concerned.

In running a street-car, as thus constructed and provided with the instrumentalities hereinbefore described, it will be seen that the services of a conductor can readily be dispensed with, as the driver can perform all the duties of both without quitting for a moment his post on the platform in front.

Having described my improvement, what I claim as of my invention, and desire to secure by Letters Patent, is—

The combination of the rear entrance sliding door, mechanism for operating the same from the front of the car, and a street-car body provided with a fare-box, substantially as and for the purpose set forth.

THOS. CASTOR.

Witnesses:
WM. HALL WAXLER,
DANIEL R. HART.